(12) United States Patent
Randleman (10) Patent No.: US 9,663,037 B2
(45) Date of Patent: May 30, 2017

(54) MULTI-STAGE SWING ARM MIRROR MOUNT

(71) Applicant: Caterpillar Inc., Peoria, IL (US)

(72) Inventor: Sean Randleman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/825,028

(22) Filed: Aug. 12, 2015

(65) Prior Publication Data
US 2017/0043722 A1    Feb. 16, 2017

(51) Int. Cl.
*B60R 1/06* (2006.01)

(52) U.S. Cl.
CPC .................. *B60R 1/0605* (2013.01)

(58) Field of Classification Search
CPC ... B60R 1/0605; B60R 1/0607; B60R 1/0615; B60R 1/0617
USPC .................. 359/841, 872; 248/479
See application file for complete search history.

(56) References Cited

U.S. PATENT DOCUMENTS

| | | | | |
|---|---|---|---|---|
| 2,458,117 A * | 1/1949 | Tolbert | ...................... | B60R 1/06 248/213.1 |
| 2,511,971 A * | 6/1950 | Dalton | ................. | B60Q 1/2665 200/51 R |
| 2,839,965 A * | 6/1958 | Budreck | ................. | B60R 1/078 248/480 |
| 2,860,546 A * | 11/1958 | Bolser | ................... | B60R 1/0617 248/279.1 |
| 2,969,715 A * | 1/1961 | Mosby | .................. | B60R 1/0617 248/285.1 |
| 3,075,431 A * | 1/1963 | White | .................... | B60R 1/0612 359/873 |
| 3,107,077 A * | 10/1963 | Lassa | .................... | B60R 1/0617 248/478 |
| 3,204,473 A | 9/1965 | Thompson | | |
| 3,294,438 A * | 12/1966 | Carson, Jr. | .............. | B60R 1/078 248/480 |
| 3,371,903 A * | 3/1968 | Thompson | ............ | B60R 1/0617 248/486 |
| 3,550,470 A * | 12/1970 | Brighton | ................. | B60R 1/061 74/502.1 |
| 3,624,818 A * | 11/1971 | Stanfield | ............... | B60R 1/0615 359/878 |
| 4,909,619 A | 3/1990 | Eifert | | |
| 5,107,374 A * | 4/1992 | Lupo | ..................... | B60R 1/0617 248/478 |
| 6,910,781 B2 | 6/2005 | Spychalla et al. | | |
| 7,178,925 B1 * | 2/2007 | Tidwell | ................... | B60R 1/074 248/480 |
| 8,172,410 B2 | 5/2012 | Rummer et al. | | |

* cited by examiner

*Primary Examiner* — Ricky D Shafer
(74) *Attorney, Agent, or Firm* — Baker Hostetler (57) ABSTRACT

A mirror mounting system including: a mirror having a reflective surface to provide an operator with a view of a surrounding area; a mirror frame configured to hold the mirror; at least one arm extending horizontally from a vehicle to support the mirror frame; the at least one arm being pivotally connected between the vehicle and the mirror frame; and a cross member configured to be attached to the vehicle and further configured to be attached to at least one of the following: the at least one arm and the at least one mirror frame.

20 Claims, 8 Drawing Sheets

MULTI-STAGE SWING ARM MIRROR MOUNT

TECHNICAL FIELD

The disclosure is related to a multi-stage swing arm mirror mount used in vehicles, and more particularly a multi-stage swing arm mirror mount that has mounting structure with increased strength and adjustability.

BACKGROUND

Vehicles, including off-highway vehicles, may be used for high-production mining, heavy-duty construction applications, and the like. These vehicles benefit from side-mirrors. Side mirror assembly arrangements in vehicles, such as off-highway vehicles, typically provide views of a surrounding area for the operator, and operator visibility is of paramount importance. Due to the extreme physical dimensions of the vehicle, such as a body or bed of the vehicle on some off-highway vehicle applications, mirror placement needs to extend significantly outward of the vehicle centerline for ideal visibility. One problem that this extreme extension creates is an effect on the overall machine or vehicle width dimensions, for transportation clearance and even operation in some environments. For example, the manufacture, assembly, and transport of these vehicles may not occur all in one place. Major components are manufactured and assembled at multiple facilities then shipped to the customer site for final assembly. Another problem that the extreme extension of mirror placement creates is an effect on when an off-highway vehicle must be moved from one job site to another for any reason and the vehicle cannot simply be driven on public roads due to its exceptional size and weight. Moving an off-highway vehicle requires dis-assembly, loading on to semi-trailer trucks, transport and re-assembly at the new location. Additionally, some environments such as mining operations, require vehicles to operate with limited clearances. In other environments, clearance is not nearly as critical. Vehicle mirrors need to operate in any environment to provide the best possible view.

Importantly, use of a mirror assembly that cannot extend significantly outward of the vehicle centerline is not tenable because operator visibility is of paramount importance and these machines and vehicle components extend in all dimensions. For example, vehicle beds may extend 20-30 feet in width. Those in the industry know that visibility is a constant battle and any lesser mirror configuration may lend itself to hampered operator visibility.

Another problem is that in the industry, construction and operation of an off-highway vehicle needs to take into account varying operator size as a factor. Ergonomics is important for optimal and safe use of the vehicle. Adjustability of side-mirrors for a wide range of operator sizes is needed. The off-highway vehicle needs to be able to accommodate a range of a 50% female to the 99% male size. Depending on operator size, visibility again becomes a constant battle and multiple points of interference in visibility can occur. Many mirrors lack the adjustability and flexibility of extending past the centerline.

Side-view mirrors that extend outward a couple meters without the ability to fold back towards the cab during shipment or use in a tight clearance width environments is a problem. This affects the overall machine width dimensions, for transportation clearance and even operation. Current systems and vehicles with side or rear-view mirror mounts have used detent-configured swing mechanisms to improve adjustability, flexibility, and visibility—but due to vibration, cost, poor operation, and/or weight, they have not been viable for the systems discussed prior. Many devices and techniques for adjustably mounting safety mirrors to vehicles have been developed that fail to address the above noted problems.

U.S. Pat. No. 6,910,781, entitled "Quick release vehicle mirror", discusses the use of a mirror assembly for a vehicle that is securable to a tubular member with a pivotable central axis that includes a clamping assembly, a housing that is coupled to the clamping assembly to support a mirror, and a latching assembly that engages the clamping assembly and the housing and is movable between a latched position and an unlatched position. However the latched and unlatched positions do not include structure allowing for the mirror to be adjustable along a cab nor can accommodate various transport positions.

Many of these and other shortcomings of the prior art are addressed by the various aspects in the present disclosure.

SUMMARY OF THE DISCLOSURE

In one aspect, the disclosure describes a mirror mounting system including: a mirror having a reflective surface to provide an operator with a view of a surrounding area; a mirror frame configured to hold the mirror; at least one arm extending horizontally from a vehicle to support the mirror frame; the at least one arm being pivotally connected between the vehicle and the mirror frame; and a cross member configured to be attached to the vehicle and further configured to be attached to at least one of the following: the at least one arm and the at least one mirror frame.

In one aspect, the disclosure describes a mirror mounting system including: a mirror having a reflective surface to provide an operator with a view of a surrounding area; a mirror frame configured to hold the mirror; at least one arm extending horizontally from a vehicle to support the mirror frame; the at least one arm being pivotally connected to both the vehicle and the mirror frame; and a cross-member configured to be pivotably attached to the vehicle and further configured to be pivotably attached to at least one of the following: the at least one arm and the at least one mirror frame.

DETAILED DESCRIPTION

Now referring to the drawings, wherein like reference numbers refer to like elements, there is an illustrated a mirror mounting system 110 may be configured to include a mirror mounting cross-member 240 that connects to a mount 202 on a side of a vehicle 100 or an operator cab 130. The cross-member 240 may be a multi-stage swing arm for a mirror frame that can articulate and allow the mirror mounting system 110 to articulate or swing horizontally outward from the vehicle through a plus-or-minus 90 decree arc. This may be accomplished with a cross-member 240 that may be adjustable in length and/or movable to provide two or more secured hold positions for the mirror 120 placement. The mirror mounting system 110 may be fully mechanical or also may be electrically actuated and controlled to be adjustable in length and/or movable to provide two or more secured hold positions.

Figure 1:
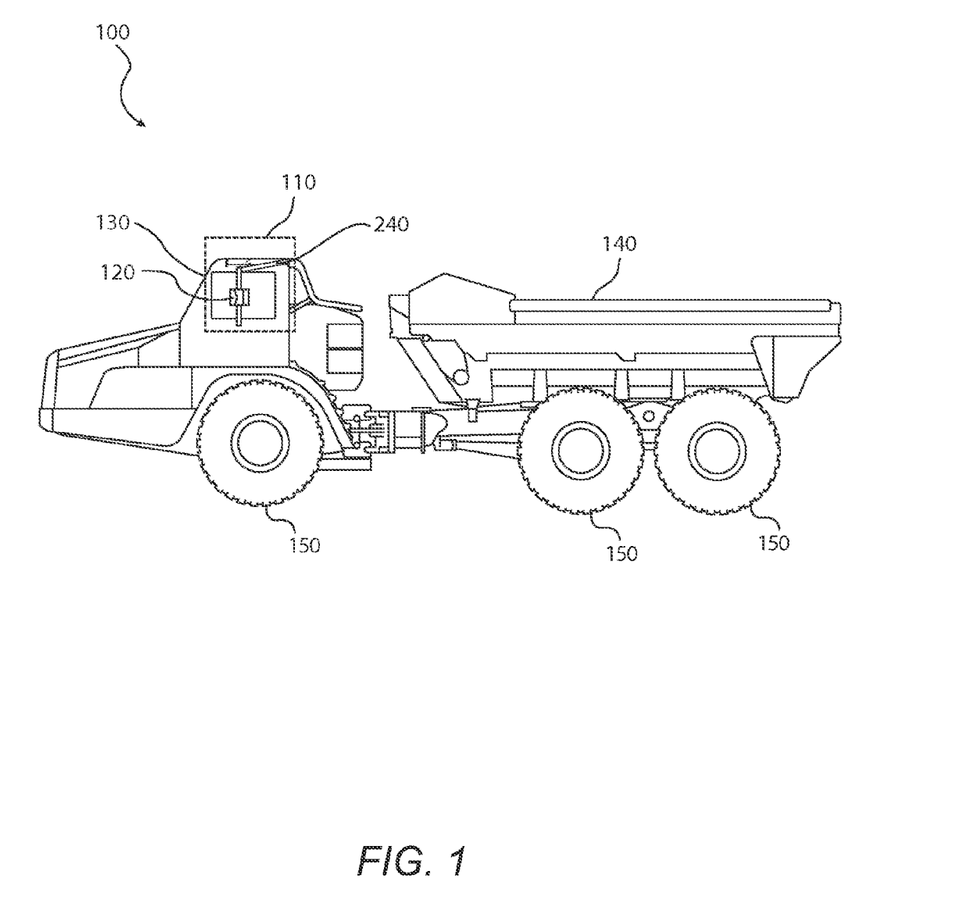
FIG. 1 illustrates an exemplary vehicle that includes a multi-stage swing arm mirror mount in accordance with aspects of the present disclosure.

Referring to FIG. 1, the vehicle 100, such as articulated truck, that includes the operator cab 130 that may include a vehicle bed 140, or also often referred to as a vehicle body, is illustrated. Both the operator cab 130 and the vehicle bed 140 rest upon at least one ground engaging member 150. The vehicle 100 may further include an engine, a frame, axles, a differential, wheels, tires, a hydraulic system, and a vehicle bed 140. The engine may include a transmission to transmit rotational power to move the vehicle 100. The vehicle bed 140 may be connected and supported by the at least one ground engaging member 150. The mirror mounting system 110 may be located and may be attached to the side of the vehicle 100, or in a particular aspect illustrated to at least one side of the operator cab 130. The mirror 120, including a housing and a reflective surface, is rotatably affixed to the mirror mounting system 110 and may be located at an outwardly most point of the mirror mounting system 110 from the side of the vehicle 100.

Figure 2:
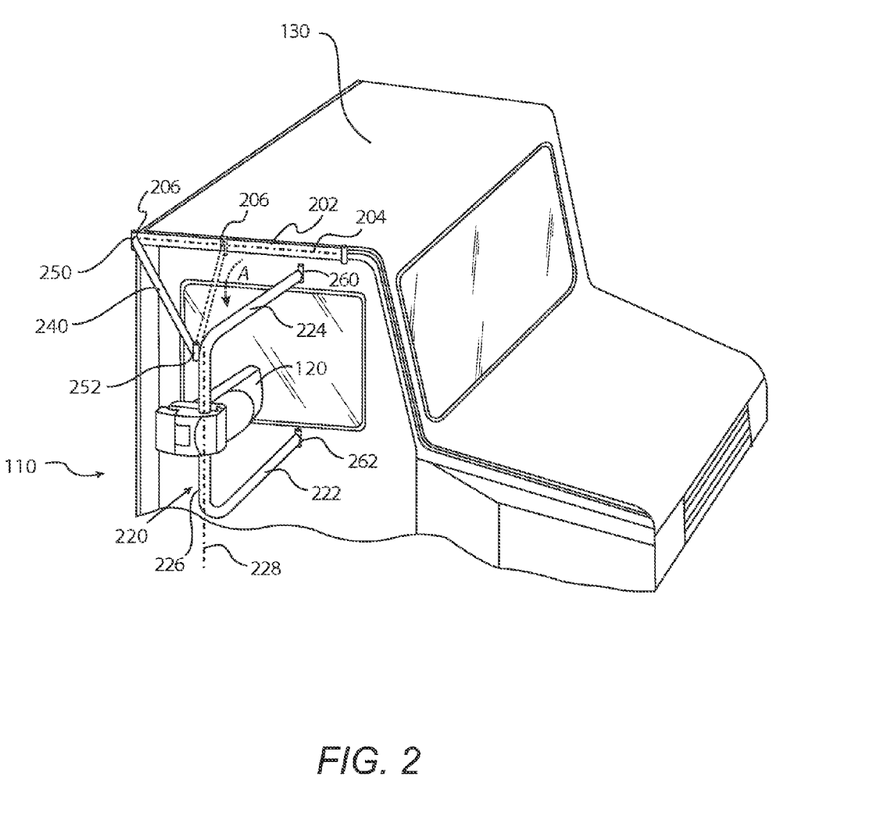
FIG. 2 partially illustrates a cab of the vehicle with a side-view of an exemplary construction of a multi-stage swing arm mirror mount in accordance with aspects of the present disclosure.

FIG. 2 illustrates a partial view of the side of the vehicle 100 containing an exemplary aspect of the mirror mounting system 110. The mirror mounting system 110 may include the mount 202 that is attached to a side of the vehicle 100 or the operator cab 130, as illustrated. The mount 202 may include an adjustable latch path 204 that runs a length of the mount 202 and acts as a type of path along which the overall swing arc, shown by Arrow A, of the mirror mounting system 110 swings horizontally outward or inward from the vehicle 100. The swinging movement shown by Arrow A illustrates how the operator may adjust the mirror mounting system 110 to a desired location and orientation for optimal driver viewing. The swinging movement shown by Arrow A can also illustrates how the operator may move the mirror mounting system 110 to stow position for transport. The mount 202 may include a cross-member first pivot joint 250 that is positioned on a first end of the mount 202 and that first pivot joint 250 may engage a mirror mounting cross-member 240, thereby securing the cross-member 240 to the vehicle 100. In another aspect, the pivot joint 250 may include a substantially U-shaped, flexible member, a portion of which snugly encircles the mirror mounting cross-member 240. The first pivot joint 250 may include a hinge that may be a loose hinge.

The cross-member 240 may have a tubular construction with a steal material. However, other constructions are contemplated as well. The cross-member 240 may alternatively have a square or rectangular beam construction. The material of the cross-member 420 may be aluminum, steel, carbon, a synthetic material, any similar material with similar material properties, and combinations thereof The ends of the cross-member 240 may be pivotally secured by fasteners such as, bolts, rivets, pins, screws, nuts and the like to form pivot joints. The cross-member 240 may extend away from the operator cab 130 where the second end includes a cross-member second pivot joint 252 that allows for pivotable and rotatable attachment to the mirror mounting frame 220. The second pivot joint 252 may have a similar construction to the pivot joint 250. The mirror mounting frame 220 may be attached to an upper arm 224, center arm 226, and lower arm 222. Other constructions are contemplated as well.

In the FIG. 2 illustration, the upper arm 224 may be pivotally attached to the operator cab 130 by an upper arm pivot joint 260 and the lower arm 222 may be pivotably attached to the operator cab 130 by a lower arm pivot joint 262. In another aspect, to provide further support, a second cross-member 240 can be pivotably attached to the mirror mounting frame 220. In another aspect, there may be more than one cross-member that is attached at multiple pivot points along the upper arm 224, the lower arm 222, and/or the center arm 226. The cross-member 240 may be tightened or loosened, depending on the design of the cross-member 240 application as discussed herein below with reference to FIGS. 3-6, to allow for full swinging or folding outward and inward in an arc illustrated by Arrow A from the operator cab 130.

The mirror mounting system 110 may be fully mechanically implemented as described herein. Alternatively, the mirror mounting system 110 may be electronically controlled with an electronic actuator to move various components of the mirror mounting system 110.

In an aspect, the mirror 120 and/or mirror mounting frame 220 may have a remote control adjustment system so as to electronically provide adjustments to an orientation of the mirror 120. Electronically providing adjustments might be by using an electronic actuator. Such a remote control adjustment system may include one or more electronic actuators and associated controlling mechanisms for the operator to adjust the orientation of the mirror 120 as is known in the art. The mirror 120 may also be heated for removal of condensation or ice as is known in the art.

In an aspect, the cross-member 240 may be fixed in length. In another aspect, referring in part to FIGS. 3-7 below, the mirror mounting system 110 may include an adjustable, or variable, length cross-member 240. In another aspect, the mirror mounting system 110 may include a mount 202 with multiple cross-member lock locations 206 along an adjustable latch path 204 for the cross-member 240 to attach at the desire of the operator. In yet another aspect, the mirror mounting system 110 may include both an adjustable length cross-member 240 and a mount 202 with at least two lock locations 206 for the cross-member 240 to attach.

The mount 202 may be a rail on the operator cab 130 that captures but allows the cross-member to slide. The lock locations 206 may be constructed as notches in a latch path 204 of the mount 202, or as locations 206 by which the cross-member 240 may lock into place with a mechanical fastener, or may be designed for the cross-member 240 to glide along the cross-member adjustable latch path 204 of the mount 202 with friction lock locations 206. For example, the mount 202 may include detents and the first pivot joint 250 may include a mechanical fastener that engages the detents to implement the lock locations 206. Alternatively, the mount 202 may include a surface and the first pivot joint 250 may include a mechanical threaded fastener that engages the surface to implement the lock locations 206. Alternatively, the mount 202 may include a pawl and latch construction that engages the surface to implement the lock locations 206. Alternatively, the mount 202 may include a pin joint construction that engages the surface to implement the lock locations 206. Alternatively, the mount 202 may include a striker bolt construction that engages the surface to implement the lock locations 206.

Alternatively, the cross-member 240 may move along the cross-member adjustable latch path 204 of the mount 202 with an electrical actuator to various locations as controlled by the operator. For example, the mount 202 may include an a threaded shaft and the first pivot joint 250 may include corresponding threads such that rotation of the threaded shaft may result in movement of the first pivot joint 250 along the cross-member adjustable latch path 204. The threaded shaft may further include a motor, power source, control circuitry, and associated transmission to provide and control the rotational movement.

In one aspect, the mirror 120 assembly itself may be secured to the mirror mounting system 110 in any of a number of different ways. In one aspect, the mirror 120 is rigidly attached to the center arm 226 of the mirror mounting frame 220. The mirror 120 assembly can be attached at any point along the center arm axis 228. The mirror mounting system 110 in such condition will readily conform to the contours of the vehicle.

Referring now to FIGS. 3-7, extension and retraction of any of these aspects may include a rigid cross-member, or may be utilizing: a swedging construction, a threaded lock, a telescoping tubular construction, and/or with a sheath lock or a camming lever. Additionally, other constructions are contemplated for extension and retraction of the cross-member 240 consistent with the disclosure.

Figure 3:
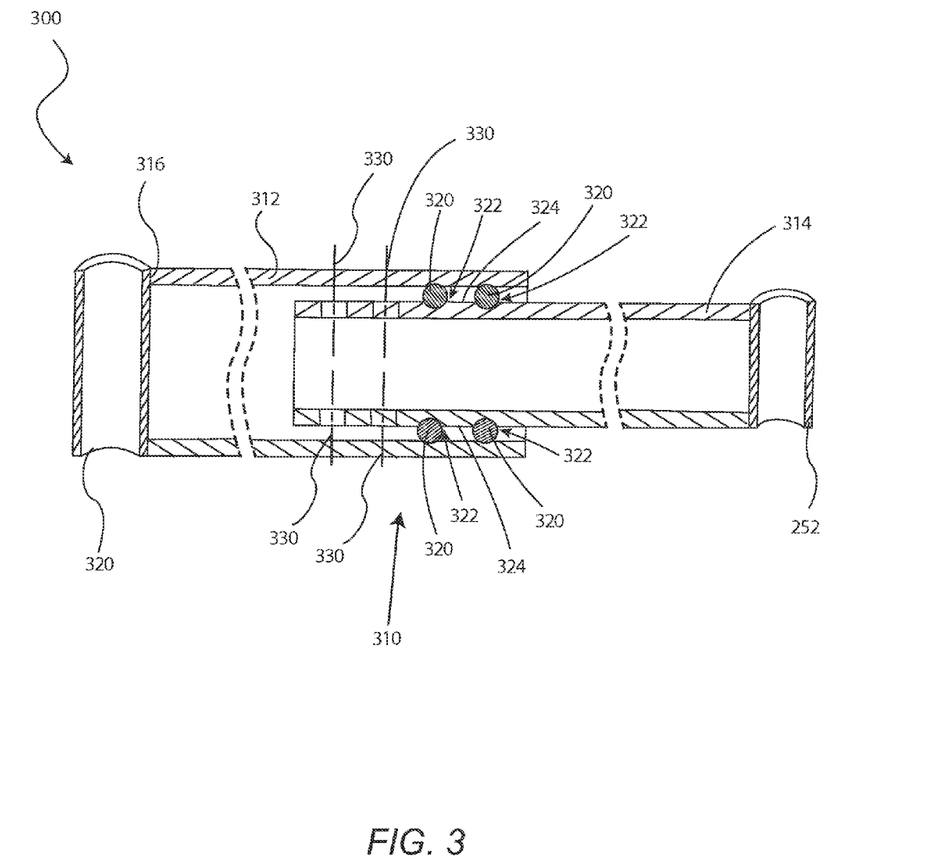
FIG. 3 is a cross-sectional view of an exemplary construction of a cross-member that includes a swedging corrugated tube in accordance with aspects of the present disclosure.

In an exemplary aspect illustrated in FIG. 3, a swedging construction 300 of the cross-member 240 may include a tubular member 310 with an outer tube 312 and an inner tube 314 wherein the outer tube 312 telescopically receives the inner tube 314 of the tubular member 310 with a swedging construction. In an aspect that allows for a variable length tubular member 310 extension and retraction, there may be multiple inner tubes 314 slipping in and out of outer tubes 312 of the tubular member 310. In an aspect, the outer tube 312 may be connected to the first pivot joint 250 and the inner tube 314 is connected to the second pivot joint 252. In this way the cross-member swedging construction 300 ultimately provides a connection between the vehicle 100 and the mirror mounting frame 220 (with reference to FIG. 2).

The outer tube 312 of the tubular member 310 may include one or more sealing members 320 and one or more pressure relief holes 330. In this manner, the overlapping joint between the inner tube 314 of the casing 316 and the outer tube 312 of the tubular member 310 may be pressure-tight and the pressure on the interior and exterior surfaces of the tubular member 310 is equalized during the extension/retraction process. The sealing member 320 may be an O-ring or may be some other sealing fastener. In an aspect, the at least one sealing member 320 may be seated within recesses 322 formed in an outwardly surface 324 of the inner tube 314 of the tubular member 310. In an aspect, the sealing members 320 may be bonded or molded onto the outwardly surface 324 of the inner tube 314. The pressure relief holes 330 may be positioned in the last few feet of the tubular member 310. The pressure relief holes 330 may reduce the operating pressures required to expand the outer tube 312 of the tubular member 310.

Figure 4:
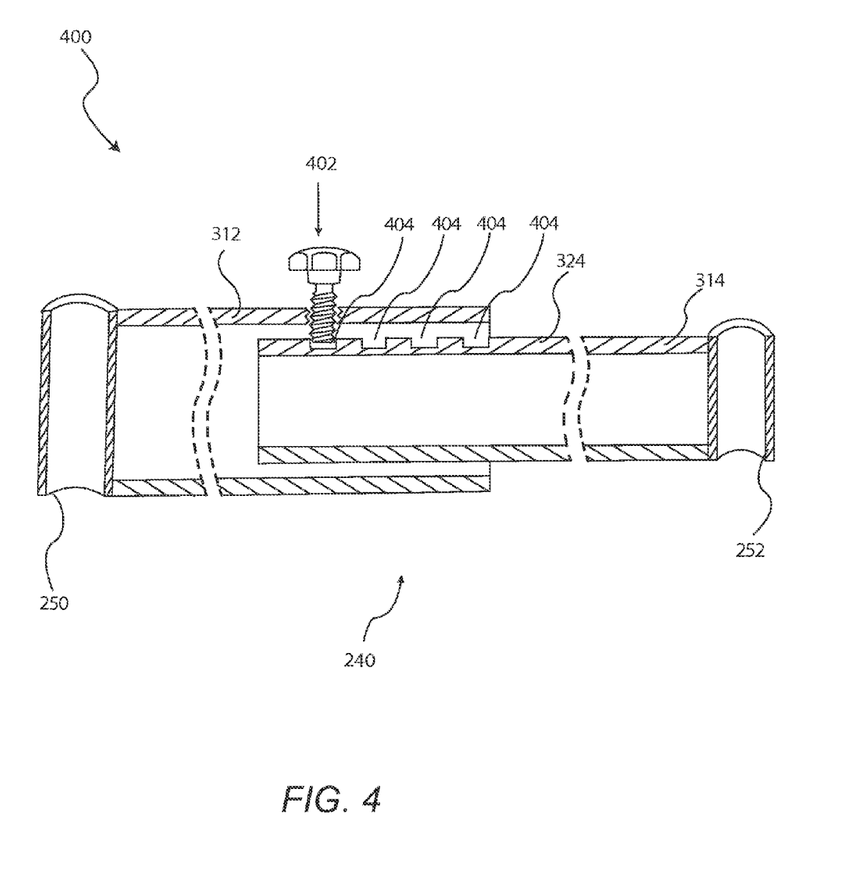
FIG. 4 is a cross-sectional view of an exemplary construction of a cross-member beam that has a threaded-lock in accordance with aspects of the present disclosure.

In an exemplary aspect, as illustrated in FIG. 4, the cross-member 240 may include a telescoping threaded lock construction 400. A telescoping and sliding construction may include the cross-member 240 that is a tubular member 310 with an outer tube 312 and an inner tube 314 wherein the outer tube 312 telescopically receives the inner tube 314 of the tubular member 310. A threaded lock bolt 402 may be joined with the outer tube 312. The threaded lock bolt 402 may have conical threads. The inner tube 314 may have ratches 404 that can tightly fit with the screw 402. When the tubes 312, 314 are aligned to the operator's desire, the lock bolt 402 can fit into one of the ratches 404 may hold and lock in place of the cross-member 240. When a smaller mirror arc angle is needed, the first ratch 404 on the inner tube 314 may be employed to fit snugly with the lock bolt 402. When larger angle is desired, the threaded lock bolt 402 may be loosened to allow free movement of the inner tube 314 and employ any of the other ratches 404 on the inner tube 314 to fit snugly with the lock bolt 402. As a further alternative, the telescoping threaded lock construction 400 may be implemented without ratches 404 and the lock bolt 402 contact the surface of the inner tube 314 to limit movement.

Alternatively, the cross-member 240 may be implemented without the lock bolt 402 and ratches 404 and extend with an electrical actuator to various locations as controlled by the operator. For example, the cross-member 240 may include an a threaded shaft and corresponding threads such that rotation of the threaded shaft may result in the extension or retraction of the cross-member 240. The threaded shaft may further include a motor, power source, control circuitry, and associated transmission to provide and control the rotational movement.

Figure 5:
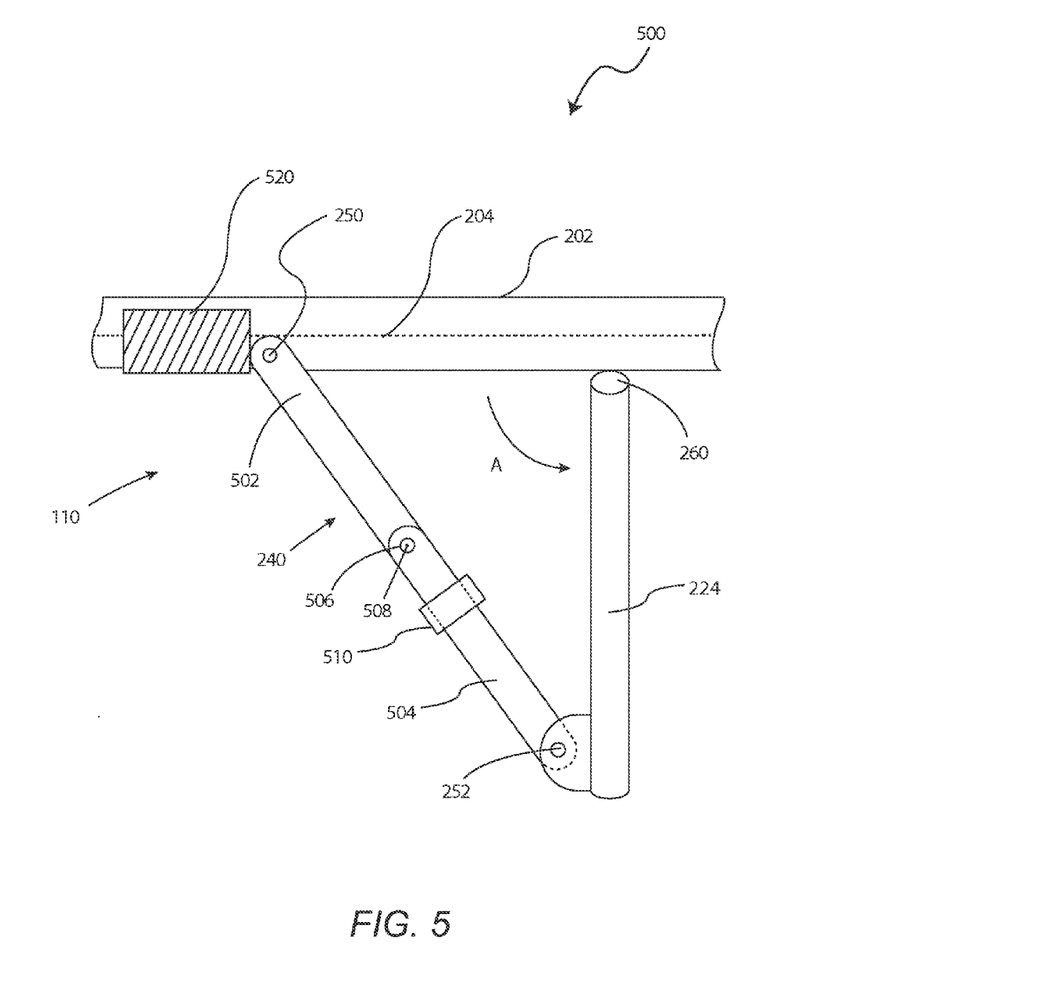
FIG. 5 is a top view of an exemplary construction of a cross-member that includes two articulable locking members in accordance with aspects of the present disclosure.

Referring to FIG. 5, in another aspect the cross-member 240 has a folding articulable-arm construction 500. The construction 500 can be arranged in a retracted orientation or an extended orientation. The cross-member 240 may have a pair of articulable arms, or also referred to as articulable members, including a first arm 502 and a second arm 504. The arms 502, 504 may be connected together at a pivot point 506 with a pivot axis 508. Further, the pivot point 506 can provide some bending and/or movement together to allow the linking of the cross-member 240 to move through the binding configuration between the retracted and extended configurations. The ends of the pair of arms 502, 504 are coupled to the first pivot joint 250 and second pivot joint 252. In this way, the cross-member articulable-arm construction 500 ultimately provides a connection between the vehicle 100 and the mirror mounting frame 220 (with reference to FIG. 2) and the upper arm 224. The pair of arms 502, 504 can fold inward to bring the mirror 120 closer to the operator cab 130 or can fold outward to lock into place at the pivot point 506. When the arms are in a fully extended orientation, the mirror is at a nearly 90 degree position with respect to the operator cab 130, as illustrated by Arrow A.

A sliding cover-lock 510 may be included that has the ability to slide across the second arm 504 up to the pivot point 506. The sliding cover-lock 510 can act to lock the fully extended arms 502, 504 to hold them in place so that the mirror mounting system 110 does not fold inward unintentionally. Sliding the cover-lock 510 away from the pivot point 506 and down the second arm 504 then allows for movement of the pair of arms 502, 504 inwardly thus allowing the cross-member 240 to move towards a closed retracted orientation. In an aspect, a mount latch 520 acts in a mechanical or electrical manner to move the articulating first arm 502 along the mount 202 and the cross-member adjustable latch path 204.

Figure 6:
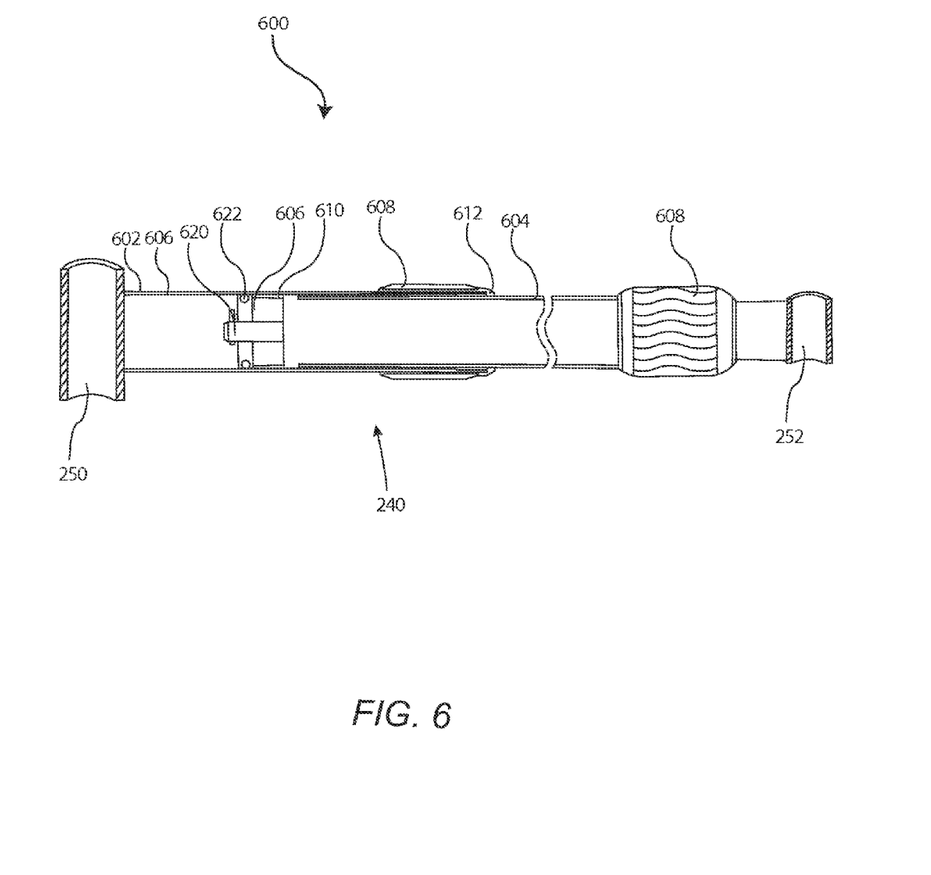
FIG. 6 is a cross-sectional view of an exemplary construction of a cross-member with a telescoping and sheath locked cross-member in accordance with aspects of the present disclosure.
Figure 7:
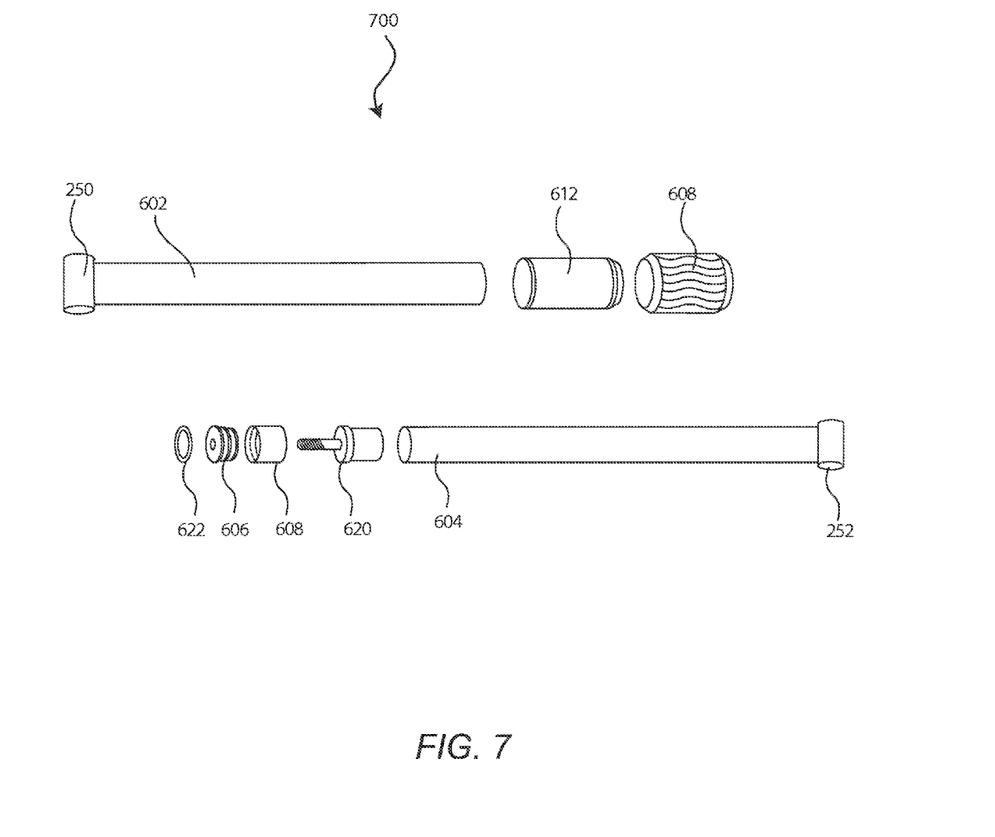
FIG. 7 is an exploded view of the cross-member of FIG. 6.

In an exemplary aspect, as illustrated in FIGS. 6-7, the cross-member 240 may include a telescoping sheath-lock construction 600, 700. The telescoping construction may include an outer tube 602 and a slidable inner tube 604. To create the cross-member 240, the outer tube 602 may be connected the cross-member first pivot joint 250. Then the outer tube 602 may be sheathed to the inner tube 604. Finally, the inner tube 604 may be connected to the second pivot joint 252.

Referring specifically to FIG. 6, a cross-section of the telescoping sheath-lock construction 600 is illustrated. A taper nut 606 may be provided inside the tubes 602, 604. A fastener, such as a taper screw 620, may be mounted on the inner tube 604 and when the inner tube 604 rotates clockwise relative to the outer tube 602, the taper screw 620 will rotate in synchronization. On the bottom of the taper screw 620 there may be conical threads. For a locking configuration, when the two tubes 602, 604 rotate inversely, the taper screw 620 may also rotate contrary to the taper nut 606. Using friction between an orientation ring 622 that is wrapped around the taper nut 606 and interfacing with the outer tube 602, the taper nut 606 is inclined to keep everything set relative to the outer tube 602. The taper screw 620 in the tube joint may rotatably cooperate with the taper nut 606 inside the tube. When the outer tube 602 is installed, the top of the outer tube 602 is connected to the pivot joint 250 and inner tube 604 is sheathed inside inner tube 602 in sequence with the assistance of a taper screw 620 on the tube joint and the tube sheath 610. The inner tube 604 may connect first by an orientation ring 622 and the protective sheath 608, then sheathes into the outer tube 602. Then in an aspect, the outer tube 602 may connect to any other smaller tubular member and may sheath into the outer tube 602 and the inner tube 604 in sequence. A tube sheath nut 612 may be provided at the end of the outer tube 602 for connection and/or locking. At the end of the inner tube 604 is a connection to the pivot joint 252. Because the taper screw 620 may be rotatable with the taper nut 606 within the tube 602, during telescopic connection of the tubes 602, 604 rotation can be limited, so when the nut cover of any tube is tightened or released, the other tube will not rotate together.

Referring just to an exploded view of the telescoping sheath-lock construction 700 of the telescoping cross-member construction 600 shown in FIG. 7, when the tube 604 rotates clockwise relative to the outer tube 602, the taper screw 620 on the inner tube 604 may rotate in synchronization. With the help of the friction between the orientation ring 622 and the outer tube 602, the taper nut 606 may remain still relative to the outer tube 602, and rotate relative to the inner tube 604. With respect to the threads, there may be opposite rotation between the taper nut 606 and the taper screw 620, and the conical thread inside may cause a sheath 610 to inflate so as to press the inner wall of the inner tube 604, as a result the tube is locked tightly. In this locking configuration, when the two tubes 602, 604 rotate inversely, the taper screw 620 also may rotate contrary to the taper nut 606, so the conical thread will not press the tube sheath 610 and the two tubes 602, 604 may then be in a release configuration. Alternatively, if the joining points of multi-segments are in a release configuration, the larger tube and the smaller tube will relatively rotate clockwise, and one of the joints may first complete the locking movement, the locking movement will be sequentially transferred to other tube joining points until the point when all tubes 602, 604 are locked tightly.

Figure 8:
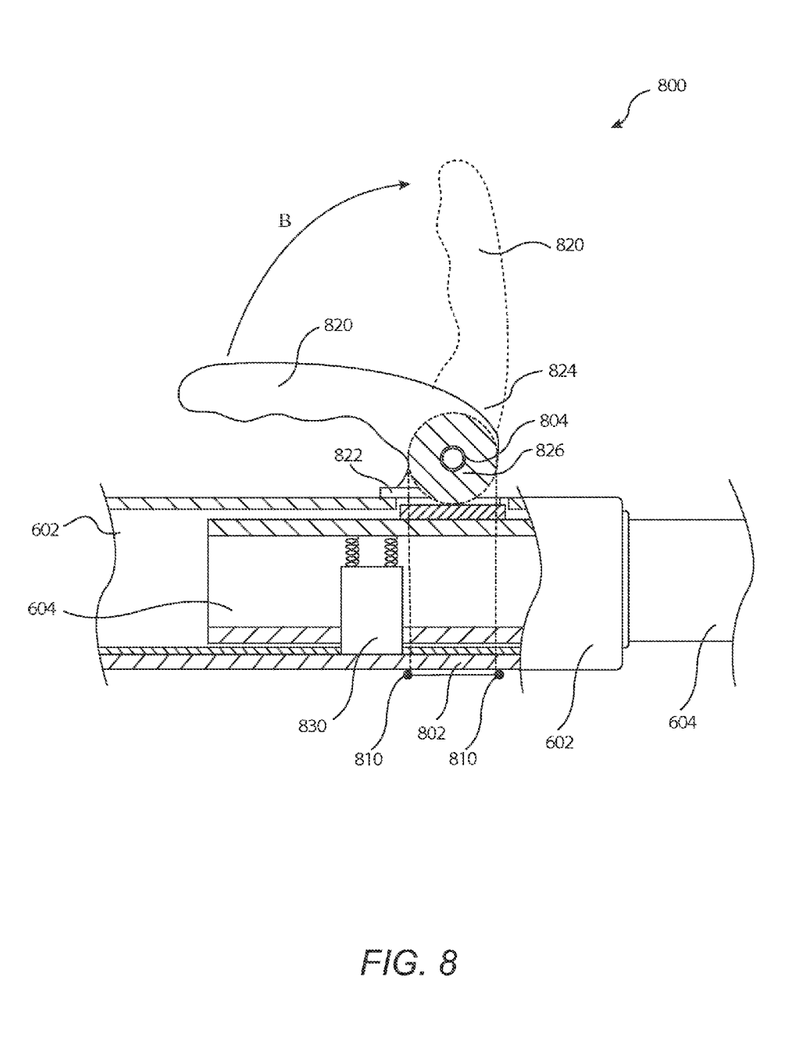
FIG. 8 is a longitudinal cross-sectional view of a cam-lever locking mechanism with a telescoping cross-member in a locked position in accordance with aspects of the present disclosure.

In another aspect illustrated in FIG. 8, a camming lever locking mechanism 800 for a telescoping tube includes a tube-encircling bracket 802 conforming to the cross-sectional shape of the outer tube 602 that joins the outer tube 602 with the inner tube 604. The bracket 802 may be formed to the shape and size of the outer tube 602 and may fit directly onto any portion of that outer tube 602. A camming lever 820 may be attached to the bracket 802 between the two arms 824 of the bracket 802 that encircle the outer tube 602. The camming lever 820 may engage and lock with the inner tube 604 through a window opening 822 in the outer tube 602 to lock the two tube 602,604 sections against a telescoping motion. The camming lever 820 may be pivotably mounted between the arms 824 of the bracket 802 by movement of a pin 804 through the camming lever 820 and the arms 824. Pivotal mounting allows for the camming lever 820 to pivot between a down or locking position and an up or release position where the camming lever 820 is brought to a generally perpendicular position, as illustrated by Arrow B. In the locked position, the cam 826 presses against a plate 840, which in turn presses against the inner tube 604, creating a friction lock between the inner tube 604 and the outer tube 602 to prevent telescoping movement between the two tubes. Also, in the locked position, the bracket 802 made be further secured in place against telescoping movement by protrusions 810 located on the outer tube 602. The locking lever mechanism 800 may further include a stop device 830 in the inner tube 604 spring biased for outward movement against the outer tube 602 during a telescoping extension. For a telescoping retraction (not pictured) of the telescoping tube, an operator may need to use manual force to contract the springs of the stop device 830 to thus allow for free telescoping movement of the inner tube 604. The camming lever 820 can be operated at any relative position of the two leg sections, so as to lock the two cross-member tubular portions 602, 604 at any desired extension.

INDUSTRIAL APPLICABILITY

The mirror assembly may be provided as part of the original equipment of a vehicle or the like, or as an add-on to be easily retrofit to provide complementary structure for engagement with the vehicle. The mirror may be utilized on many types of vehicles, including off-highway vehicles and over-the-road vehicles that may perform some type of operation associated with an industry such as mining, construction, farming, transportation, or any other industry known in the art. Moreover, any type of vehicle may benefit from side-mirrors consistent with the disclosure.

In operation, the operator may determine a desired mirror configuration and extend the cross-member such that the mirror is positioned at the desired orientation. Alternatively, the operator may determine a desired mirror configuration and then move the cross-member pivot point on the vehicle itself such that the mirror is positioned at the desired orientation. In yet another operation, the operator may determine a desired mirror configuration and extend the cross-member and move the cross-member pivot point on the vehicle itself such that the mirror is positioned at the desired orientation.

In a further operation, the operator may determine to retract the mirror configuration and retract the cross-member such that the mirror is positioned at the retracted orientation.

Alternatively, the operator may determine to retract the mirror configuration and then move the cross-member pivot point on the vehicle itself such that the mirror is positioned at the retracted orientation. In yet another operation, the operator may determine to retract the mirror configuration and retract the cross-member and move the cross-member pivot point on the vehicle itself such that the mirror is in a retracted orientation.

In a further operation, the operator may determine to extend the mirror configuration and extend the cross-member such that the mirror is positioned at the extended orientation. Alternatively, the operator may determine to extend the mirror configuration and then move the cross-member pivot point on the vehicle itself such that the mirror is positioned at the extended orientation. In yet another operation, the operator may determine to extend the mirror configuration and extend the cross-member and move the cross-member pivot point on the vehicle itself such that the mirror is in an extended orientation.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

I claim:

1. A mirror mounting system comprising:
a mirror having a reflective surface to provide an operator of a vehicle with a view of a surrounding area;
a mirror frame configured to hold the mirror;
an upper arm extending horizontally from a side of the vehicle,
the upper arm being pivotally connected to the vehicle by a first pivot joint;
a lower arm extending horizontally from the side of the vehicle,
the lower arm being pivotally connected to the vehicle by a second pivot joint,
the lower arm being substantially parallel to the upper arm;
a center arm that is substantially perpendicular to the upper arm and the lower arm,
the mirror frame being attached to the center arm along an axis of the center arm;
a mount attached to the side of the vehicle,
the mount including a third pivot joint and including an adjustable latch path that enables a movement of the mirror frame that causes the mirror frame to swing horizontally outward or inward with respect to the vehicle; and
a cross member extending horizontally from the side of the vehicle,
a first end of the cross member being attached to the third pivot joint that secures the cross member to the vehicle,
the movement of the mirror frame enabling the mirror frame to be adjusted at a desired location and orientation as the third pivot joint is attached to different locations along the adjustable latch path,
a second end of the cross member including a fourth pivot joint that is attached to the center.

2. The mirror mounting system of claim 1, wherein the cross-member is further configured to have a variable length and wherein the cross-member has a swedging construction to limit extension and retraction of the cross-member.

3. The mirror mounting system of claim 1, wherein the cross-member is further configured to have a variable length and wherein the cross-member has a threaded lock with two arms to limit extension and retraction of the cross-member.

4. The mirror mounting system of claim 1, wherein the cross-member is further configured to have a variable length and wherein the cross-member has two articulable arms with a locking mechanism to limit extension and retraction of the cross-member.

5. The mirror mounting system of claim 1, further comprising a telescoping arm locks with a sheath locking mechanism.

6. The mirror mounting system of claim 5, further comprising a camming lever locking mechanism wherein the telescoping arm locks with the camming lever locking mechanism.

7. The mirror mounting system of claim 1, wherein the cross-member is further configured to have a variable length utilizing a telescoping arm.

8. The mirror mounting system of claim 1, wherein the cross member further comprises a pivotal attachment to the vehicle; and wherein the cross-member further comprises a pivotal attachment to the center arm.

9. The mirror mounting system of claim 1, wherein the cross-member is configured to be attached to the different locations based on an electrical actuator controlled by the operator.

10. A vehicle comprising the mirror mounting system according to claim 1 and further comprising:
an operator cab that connects to the mirror mounting system;
a vehicle body; and
at least one ground engaging member.

11. A mirror mounting system comprising:
a mirror having a reflective surface to provide an operator of a vehicle with a view of a surrounding area;
a mirror frame configured to hold the mirror;
a first arm extending horizontally from a side of the vehicle,
the first arm being pivotally connected to the vehicle by a first pivot joint;
a second arm extending horizontally from the side of the vehicle,
the second arm being pivotally connected to the vehicle by a second pivot joint,
the second arm being substantially parallel to the first arm;
a third arm that is substantially perpendicular to the first arm and the second arm,
the mirror frame being attached to the third arm;
a mount attached to the side of the vehicle,
the mount including a third pivot joint and including an adjustable latch path; and
a cross member extending horizontally from the side of the vehicle,
a first end of the cross member being attached to the vehicle via a third pivot joint,
a second end of the cross member being attached to the third arm via a fourth pivot joint,
the mirror frame swinging horizontally outward or inward with respect to the vehicle as the cross member is attached to different locations along the adjustable latch path via the third pivot joint.

12. The mirror mounting system of claim 11, wherein the cross-member is further configured to have a variable length and wherein the cross-member has a swedging construction to limit extension and retraction of the cross-member.

13. The mirror mounting system of claim 11, wherein the cross-member is further configured to have a variable length and wherein the cross-member has a threaded lock with two arms to limit extension and retraction of the cross-member.

14. The mirror mounting system of claim 11, wherein the cross-member is further configured to have a variable length and wherein the cross-member has two articulable arms with a locking mechanism to limit extension and retraction of the cross-member.

15. The mirror mounting system of claim 11, wherein the cross-member is further configured to have a variable length utilizing a telescoping arm.

16. The mirror mounting system of claim 15, wherein the telescoping arm locks with a sheath locking mechanism.

17. The mirror mounting system of claim 15, further comprising a camming lever locking mechanism wherein the telescoping arm locks with the camming lever locking mechanism.

18. The mirror mounting system of claim 11, wherein the cross-member variable length is controlled by an actuator.

19. The mirror mounting system of claim 11, wherein the cross-member is configured to be attached to the different locations based on an electrical actuator controlled by the operator.

20. A vehicle comprising the mirror mounting system according to claim 11 and further comprising:
   at least one ground engaging member; and
   an operator cab.

* * * * *